United States Patent
Kampf et al.

(10) Patent No.: US 6,631,875 B1
(45) Date of Patent: Oct. 14, 2003

(54) CABLE TROUGH WITH SEPARATE SIDE ELEMENTS

(75) Inventors: Thomas W. Kampf, Minnetonka, MN (US); Mathew D. Ferris, Chaska, MN (US); Joel T. Fisher, South St. Paul, MN (US); Timothy J. Haataja, Prior Lake, MN (US); Brian L. Johnson, Maple Grove, MN (US); Wayne Johnson, Rosemount, MN (US); Alex Watts, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/669,279

(22) Filed: Sep. 26, 2000

(51) Int. Cl.[7] .................................. F16L 3/22
(52) U.S. Cl. .................. 248/68.1; 138/157; 174/101; D13/155
(58) Field of Search ............... 248/68.1, 49, 58, 248/53; 174/68.1, 68.3, 72 R, 101; 138/92, 62, 162, 157; 52/220.7, 177

(56) References Cited

U.S. PATENT DOCUMENTS

| | | |
|---|---|---|
| 3,761,603 A | 9/1973 | Hays et al. |
| 5,067,678 A | 11/1991 | Henneberger et al. |
| 5,160,811 A | 11/1992 | Ritzmann |
| 5,161,580 A | 11/1992 | Klug |
| 5,240,209 A | 8/1993 | Kutsch |
| 5,271,585 A | 12/1993 | Zetena, Jr. |
| 5,316,243 A | 5/1994 | Henneberger |
| 5,316,244 A | 5/1994 | Zetena, Jr. |
| 5,335,349 A | 8/1994 | Kutsch et al. |
| 5,503,354 A | 4/1996 | Lohf et al. |
| 5,752,781 A | 5/1998 | Haataja et al. |
| 5,923,753 A | 7/1999 | Haataja et al. |
| 5,937,131 A | 8/1999 | Haataja et al. |
| 5,995,699 A | 11/1999 | Vargas et al. |
| 6,037,538 A | 3/2000 | Brooks |
| 6,076,779 A | 6/2000 | Johnson |

FOREIGN PATENT DOCUMENTS

| | | |
|---|---|---|
| DE | 37 42 448 A1 | 6/1989 |
| EP | 0 933 850 A1 | 8/1999 |
| SU | 1272387 A1 | 11/1986 |

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "Fiber Guide™ Fiber Management System," 6 pages, dated Jun., 1989.
ADC Telecommunications brochure entitled "ADC Fiber-Guide® System Express Exit™ 2x2," 2 pages, dated May 1999.
ADC Telecommunications brochure entitled " FiberGuide® Fiber Management Systems," 37 pages, dated Jun. 1998.

*Primary Examiner*—Ramon O. Ramirez
*Assistant Examiner*—Tan Le
(74) *Attorney, Agent, or Firm*—Merchant & Gould P.C.

(57) ABSTRACT

A telecommunications cable management system includes a planar base element including a planar top surface and side edges. Side elements are mounted with a mating arrangement to the base element. The side elements may include one or more of the following: upstanding wall portions, side exits extending horizontally, and downspouts. The base elements and the upstanding wall portions may have a continuous cross-section, and can be cut to the desired length for the cable management system. The downspout and side exit elements may also include multiple components wherein a central section of each can be cut to the desired width.

15 Claims, 23 Drawing Sheets

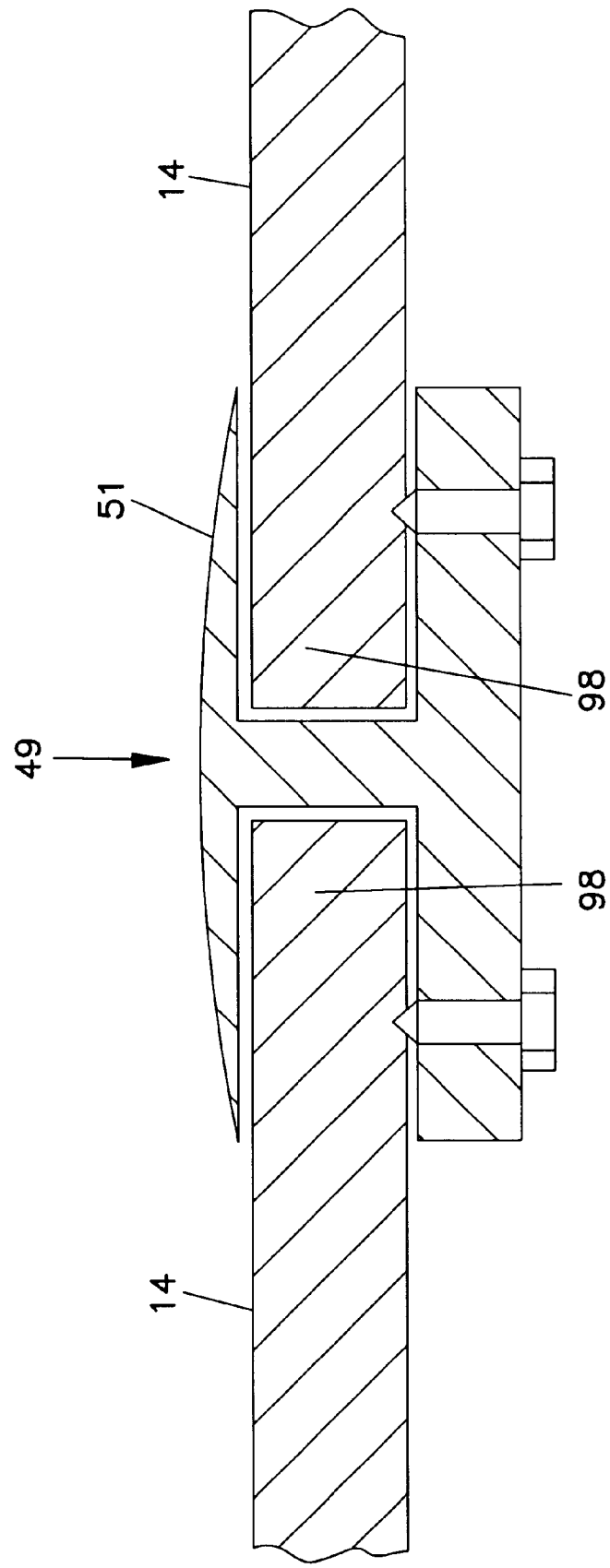

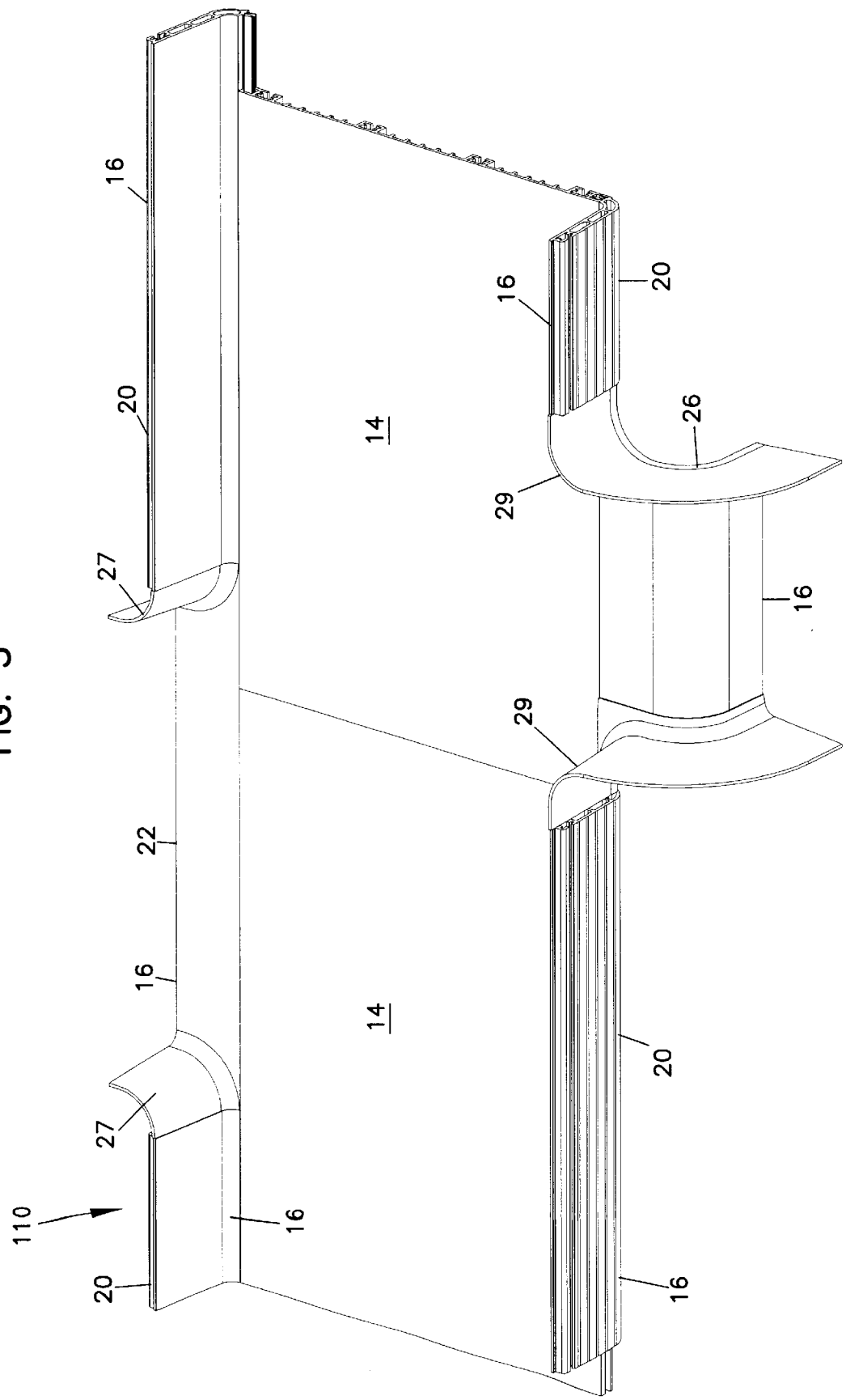

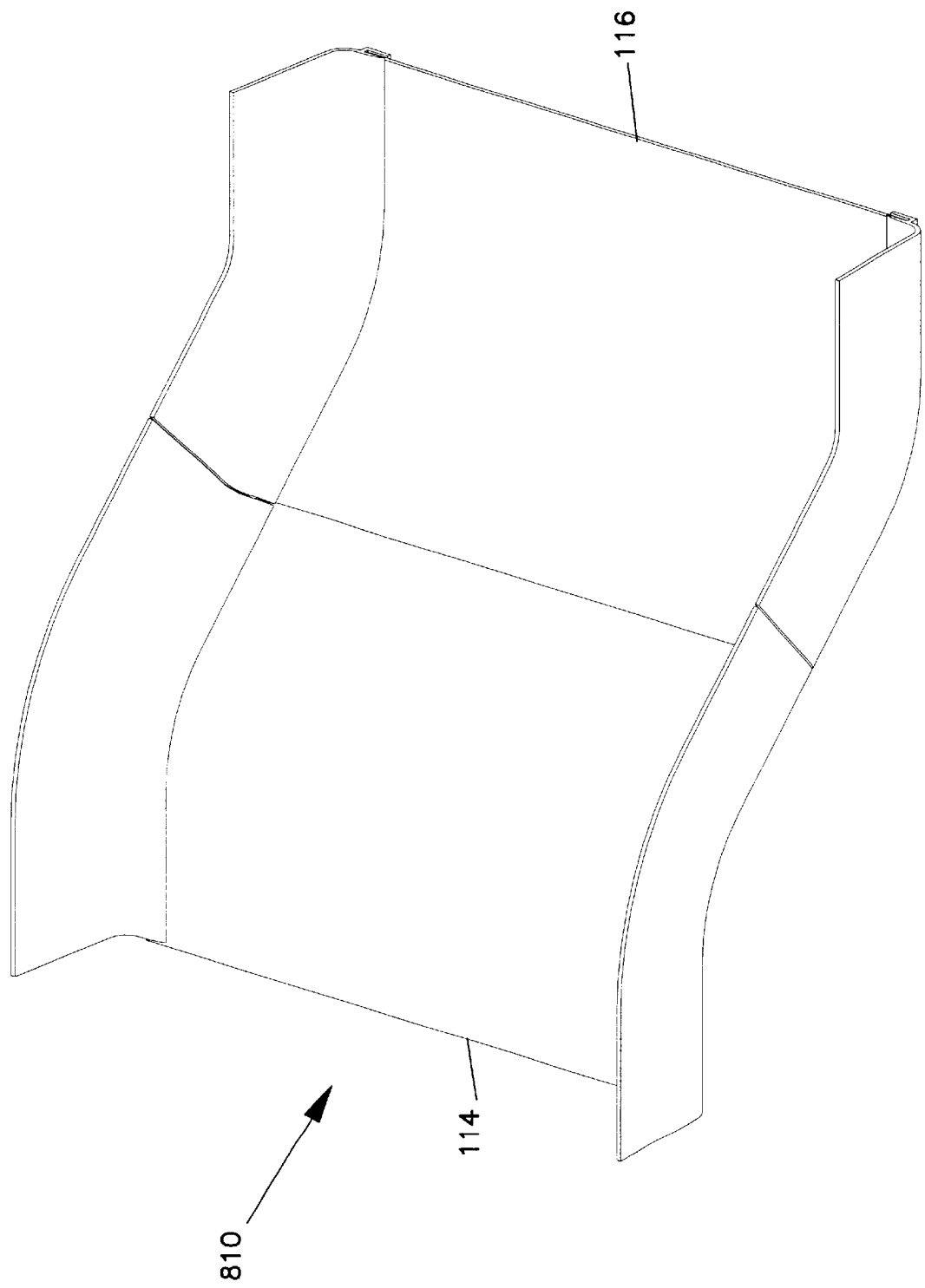

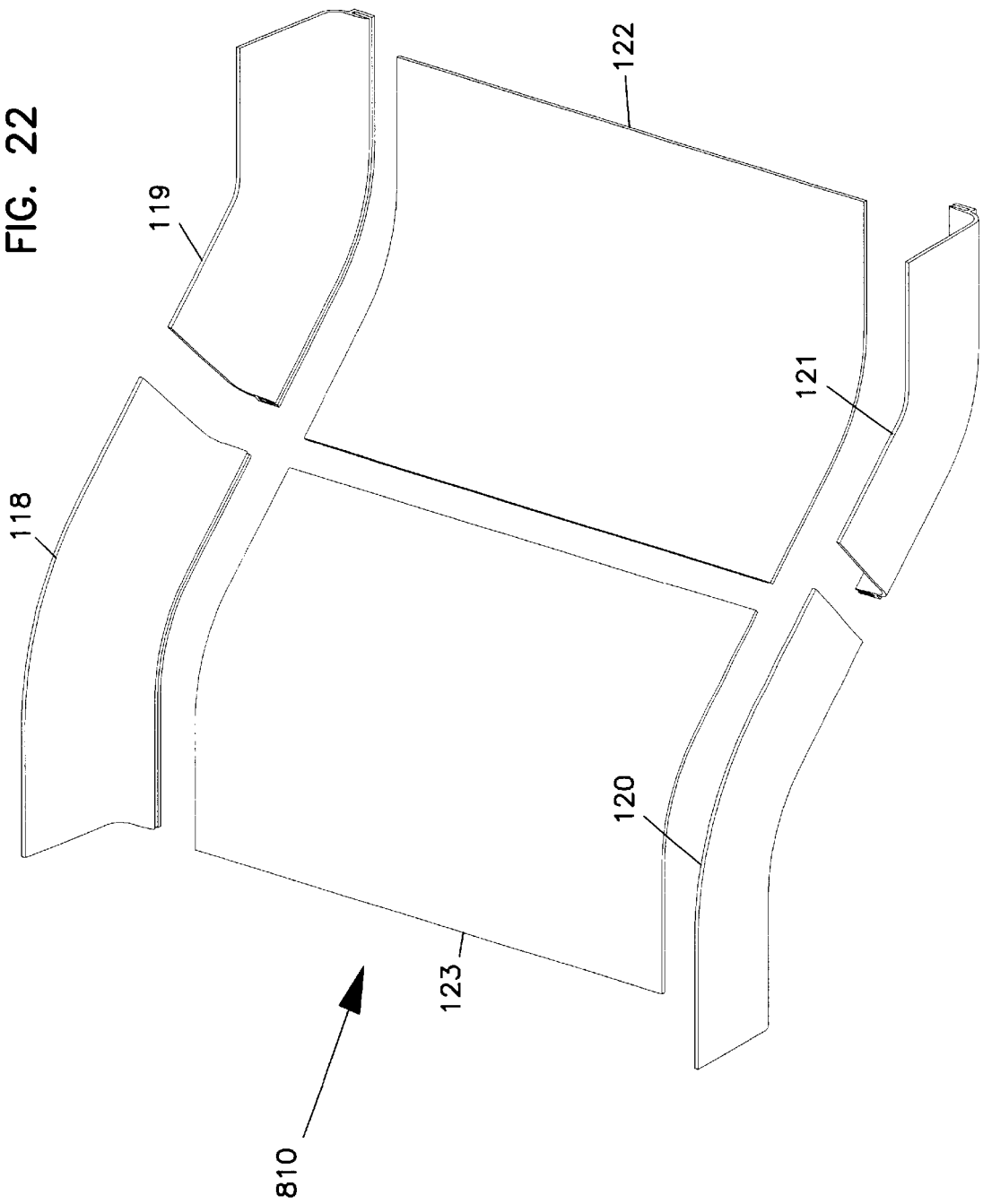

US 6,631,875 B1

CABLE TROUGH WITH SEPARATE SIDE ELEMENTS

FIELD OF THE INVENTION

This application relates to a system for the management and routing of cables, such as telecommunications cables. More particularly, this invention pertains to troughs, fittings, and couplings for the system.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Copper cables, hybrid cables or other transmission cables also need proper management and protection.

When routing optical fibers, it is desirable that a routing system will be easy to assemble, readily accessible and adaptable to changes in equipment needs. Accordingly, such routing systems include a plurality of trough members such as troughs and couplings for forming the cable routing paths. The trough system members are joined together by couplings. U.S. Pat. No. 5,067,678 to Henneberger et al dated Nov. 26, 1991 concerns a cable routing system that includes a plurality of troughs and fittings. The '678 patent further discloses a coupling (element 250 in FIG. 1 of the '678 patent) for joining trough members and fittings. With best reference to FIGS. 6–7 of the '678 patent, a plurality of hardware is disclosed for joining the trough members. U.S. Pat. Nos. 5,316,243 and 5,752,781 show additional examples of couplings.

Several concerns arise with cable routing systems, including the ease of installation of the troughs, couplings, and fittings, and the adequacy of the size of the system components to handle the number of cables in the system. One related concern is whether the system allows for sufficient flexibility by the installer or the customer for the desired types and positioning of the various system components. The system may include various downspouts and T-fittings to connect to telecommunications connector bays beneath the routing system, or to connect to other equipment. Having enough space for the cables passing through the system is a particular concern as higher and higher densities are desired for the connector bays. Also, having enough properly positioned downspouts, T-fittings, or other fittings is a concern to best manage and protect the cables from damage caused by excessive handling or bending. A still further concern is whether the system can be easily modified at a later date. There is a need for continued development of cable management systems.

SUMMARY OF THE INVENTION

A telecommunications cable management system includes a base element including a planar top surface and at least one side for receiving a separate side element for cable routing and management. In one preferred embodiment, the base element has a planar top surface, opposite lateral sides and opposite ends. Each of the sides receives one or more side elements with a mating arrangement between the sides of the base element and the side elements. The side elements may include one or more of the following: upstanding wall portions, side exits extending horizontally, downspouts, and corners with radius protective shapes. The base elements and the upstanding wall portions may have a continuous cross-section, and can be cut to the desired length for the cable management system. The downspout and side exit elements may also include a multiple component construction wherein a central section of each can be cut to the desired width. The mating arrangement allows assembly of the system on site, such as by snapping the side elements in place. Preferably, the mating arrangement allows removal of one or more side elements to vary the system configuration after initial assembly.

BRIEF DESCRIPTION OF THE DRAWING

FIG. 2A is a cross-sectional side view of end portions of two base elements linked with a coupling;

FIG. 3 is a perspective view of a second arrangement of a cable management system for positioning over a bay in accordance with the present invention;

FIG. 21 is a perspective view of a ninth arrangement in accordance with the present invention; and FIG. 22 is an exploded perspective view of the arrangement shown in FIG. 21.

DETAILED DESCRIPTION OF THE PREFERRED EMBODIMENTS

The present invention relates to a cable management system with improved flexibility and customization capabilities over prior art cable management systems. One aspect of the present invention is the use of components which are assembled to form the cable management system. Various components and configurations are anticipated in accordance with the present invention. Various examples of the components and configurations are illustrated in FIGS. 1–22. However, it is to be appreciated that numerous other components and configurations are possible.

Figure 1:
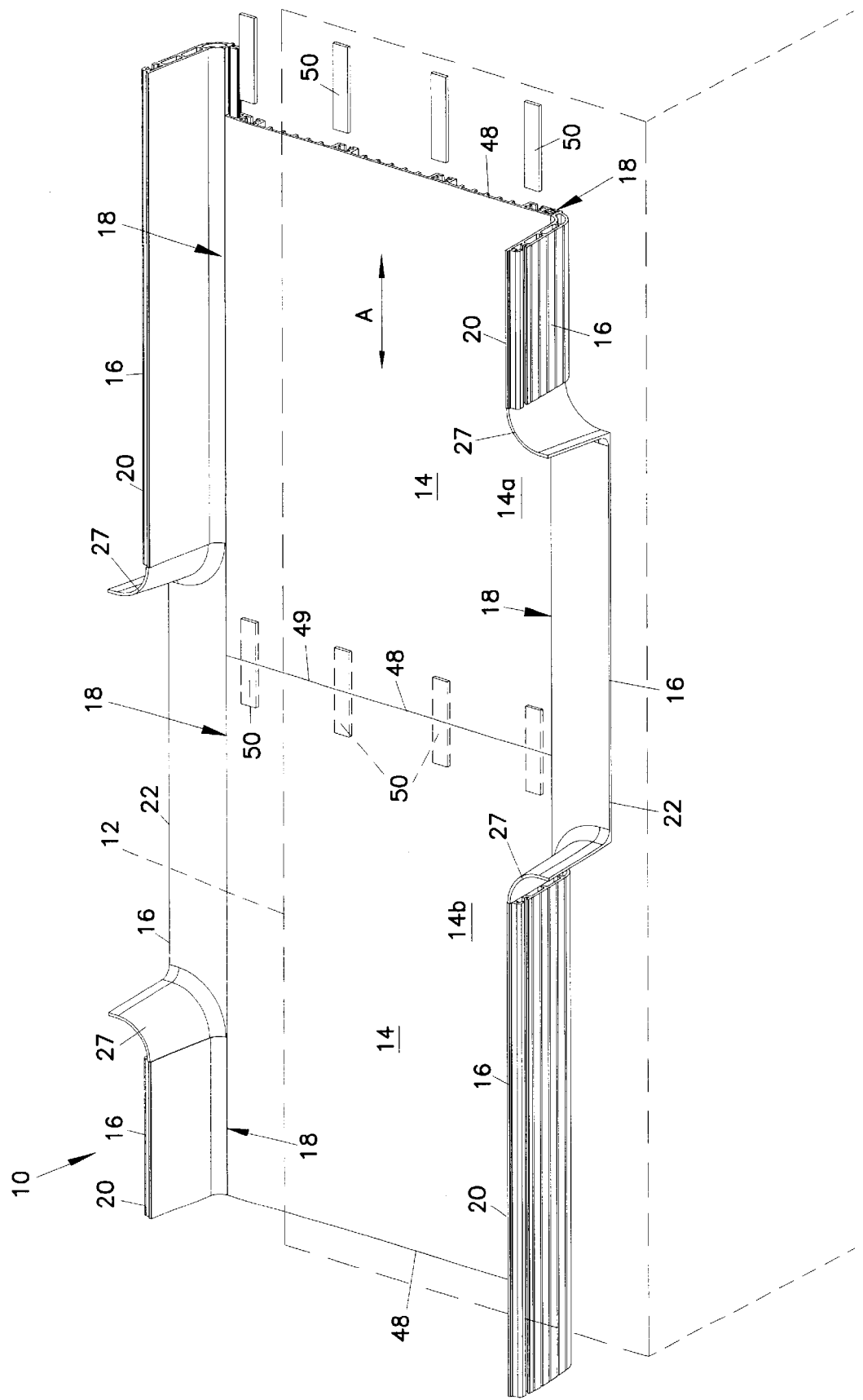
FIG. 1 is a perspective view of a first arrangement of a cable management system positioned over a bay in accordance with the present invention.
Figure 2:
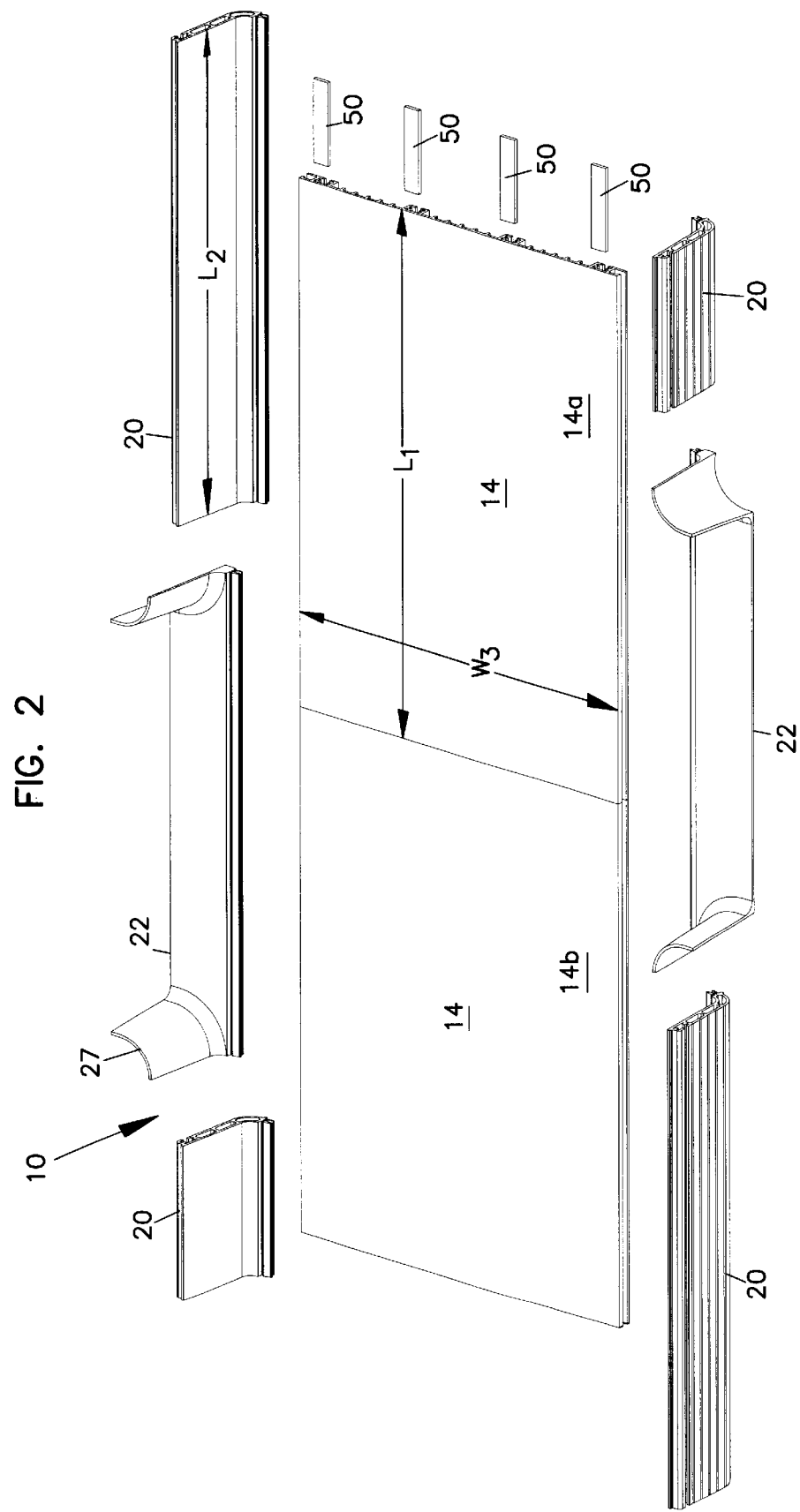
FIG. 2 is an exploded perspective view of the first arrangement of FIG. 1.

Referring now to FIGS. 1 and 2, a system 10 for cable management is positioned over a cabinet, a frame or bay 12. Bay 12 may include an array of connectors or other telecommunications equipment for connecting to the cables in system 10. System 10 is hung from the ceiling or mounted to bays 12, with various brackets and hardware as described below.

System 10 includes at least one base element 14 and various side elements 16. A mating arrangement 18 mounts the separate side elements 16 to base element 14. Base element 14 preferably has a continuous cross-section, and can be cut to the desired length $L_2$.

As shown in FIG. 1, side elements 16 include upstanding wall elements 20 and side exit elements 22. In the preferred embodiment illustrated in FIGS. 1 and 2, the mating arrangement 18 includes a tongue and groove. Other mating arrangements are possible, such as identically shaped edges joined together by couplings or links. Wall elements 20 preferably have a continuous cross-section, and can be cut to the desired length $L_2$.

Sufficient numbers of base elements 14a, b are included in system 10 to define the appropriate cable routing pathways along with side elements 16 of the desired type and size mated to base elements 14a, b. Side exit elements 22 can lead to other troughs, fittings or couplings of system 10, including additional base elements 14 of the desired width and with the desired side elements 16.

Now with further reference to FIGS. 7–11, base element 14 is generally planar and has a planar top 40, and an opposite facing bottom 42. Bottom 42 includes ribs 44, and channels 46. Preferably, base element 14 has a continuous cross-section in the longitudinal direction (Arrow A in FIG. 1). Other cross-sections, such as honeycomb, are anticipated for base element 14.

Base element 14 includes end edges 48, which are linear. One or more links or couplers 50 can be inserted into channels 46 to connect base elements 14a, b at joint 49. An alternative coupler 51 is shown in FIG. 2A. Coupler 51 captures the end edges 48. Alternatively, the two base elements 14 in FIGS. 1 and 2 can be made as a single piece.

Base element 14 further includes side edges 52 which define channels 54 of the groove for the tongue and groove mating arrangement 18 between base element 14, and side elements 16. Side edges 52 are also linear. As shown, side elements 16 can overlap two or more base elements 14.

Figure 4:
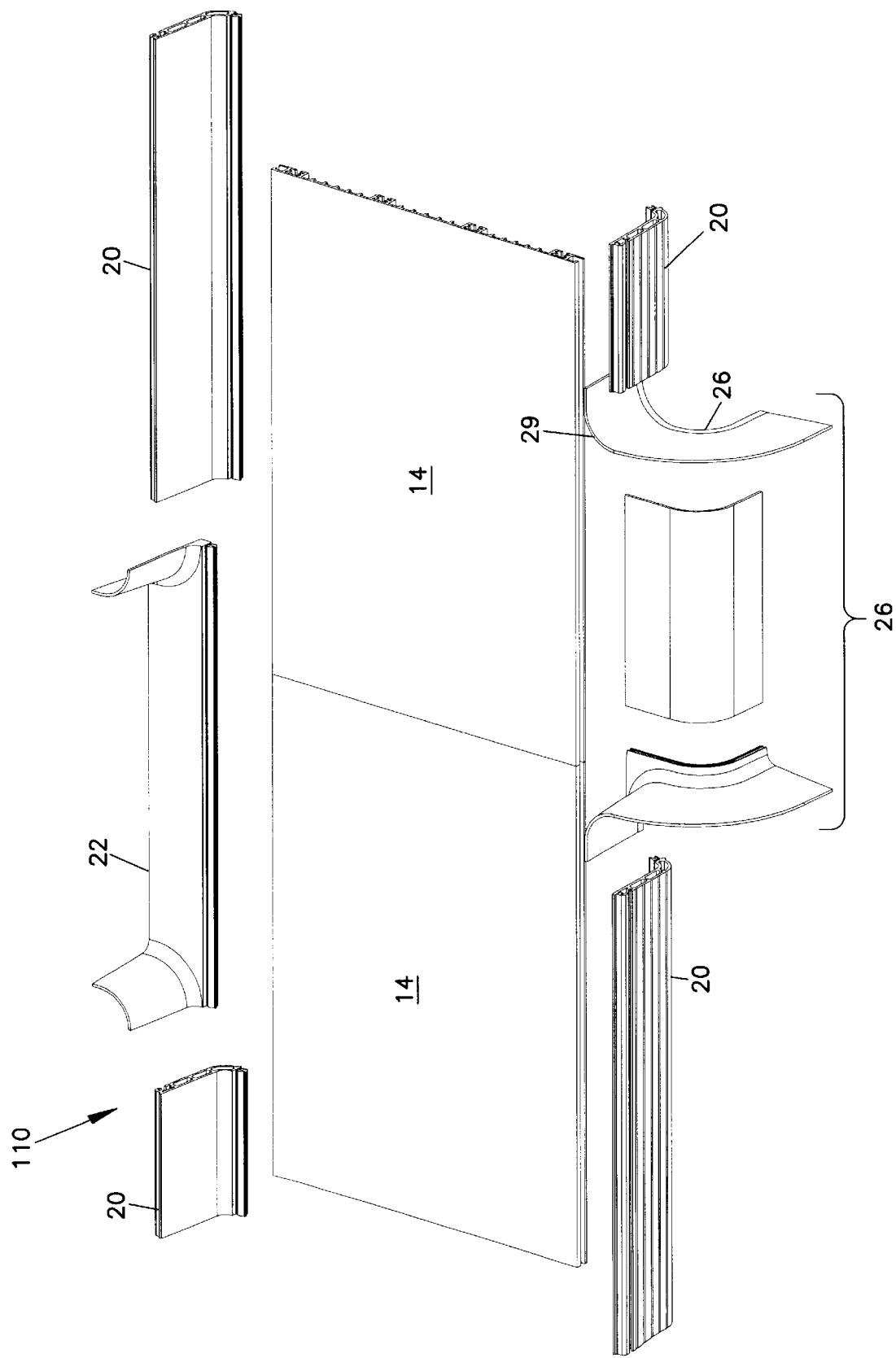
FIG. 4 is an exploded perspective view of the second arrangement of FIG. 3.

Referring now to FIGS. 3 and 4, a modified system 110 includes a downspout element 26 which replaces one of the side exit elements 22. Downspout element 26 is a further example of a side element 16 matable to one or more base elements 14.

Figure 5:
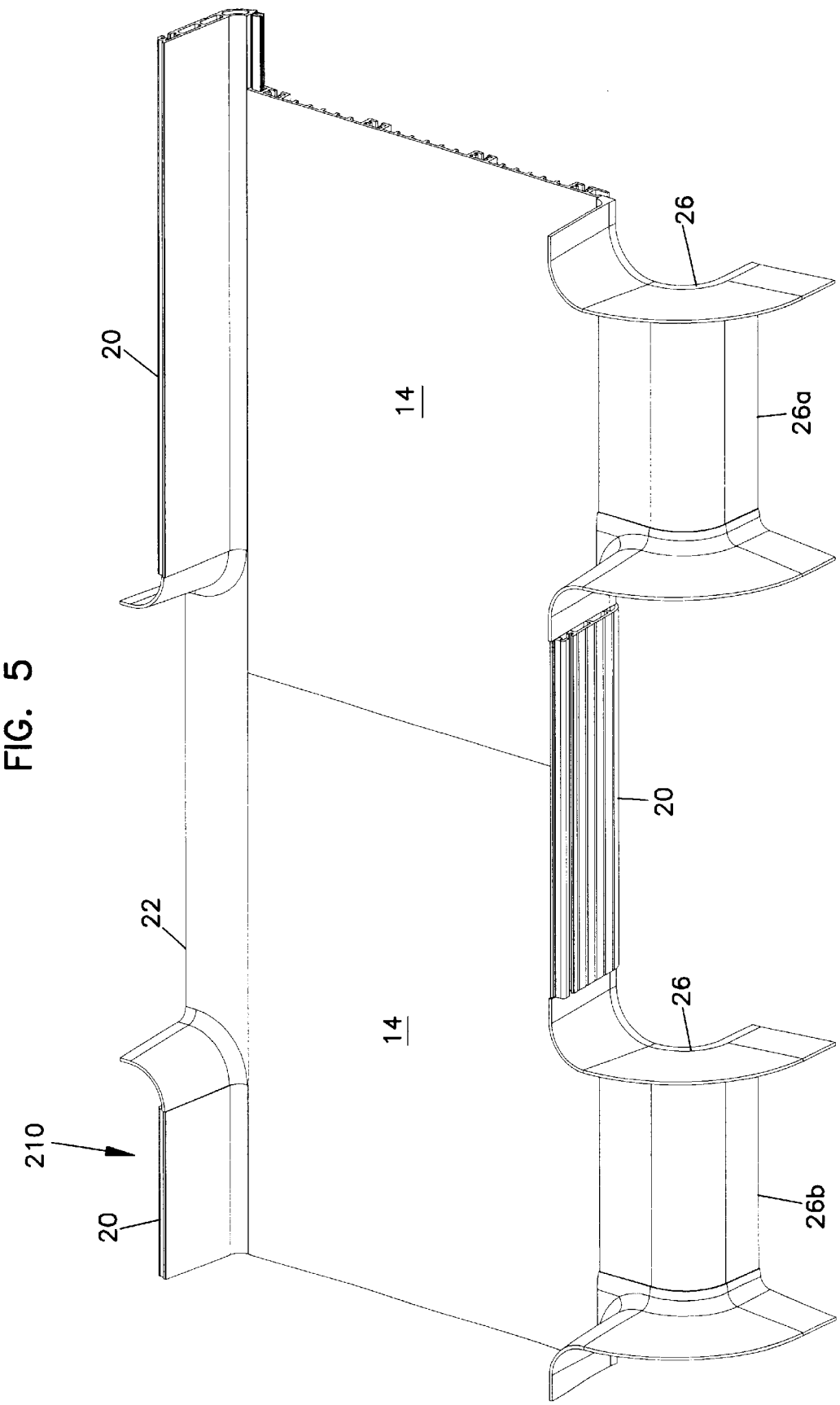
FIG. 5 is a perspective view of a third arrangement of a cable management system for positioning over a bay in accordance with the present invention.
Figure 6:
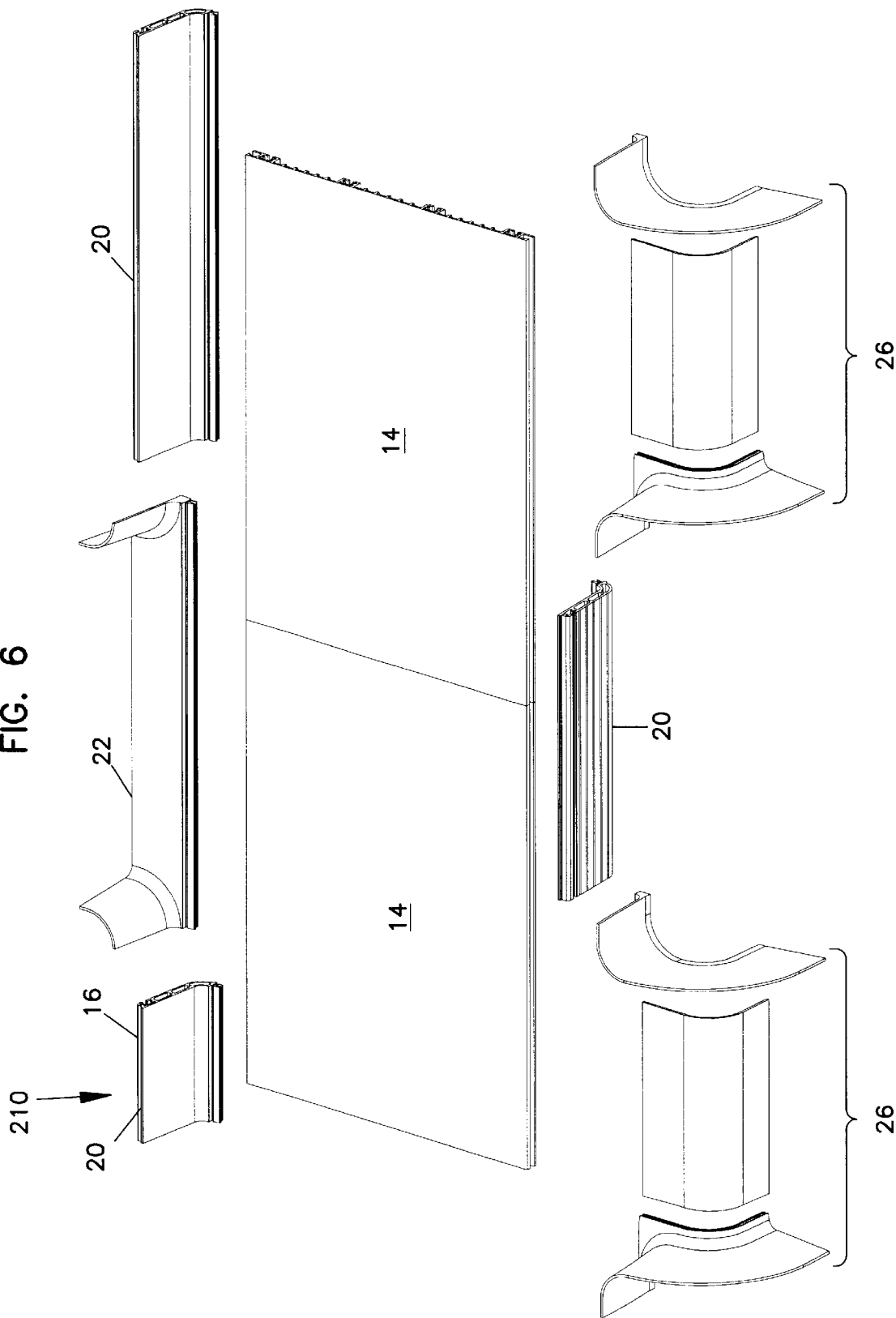
FIG. 6 is an exploded perspective view of the third arrangement of FIG. 5.
Figure 7:
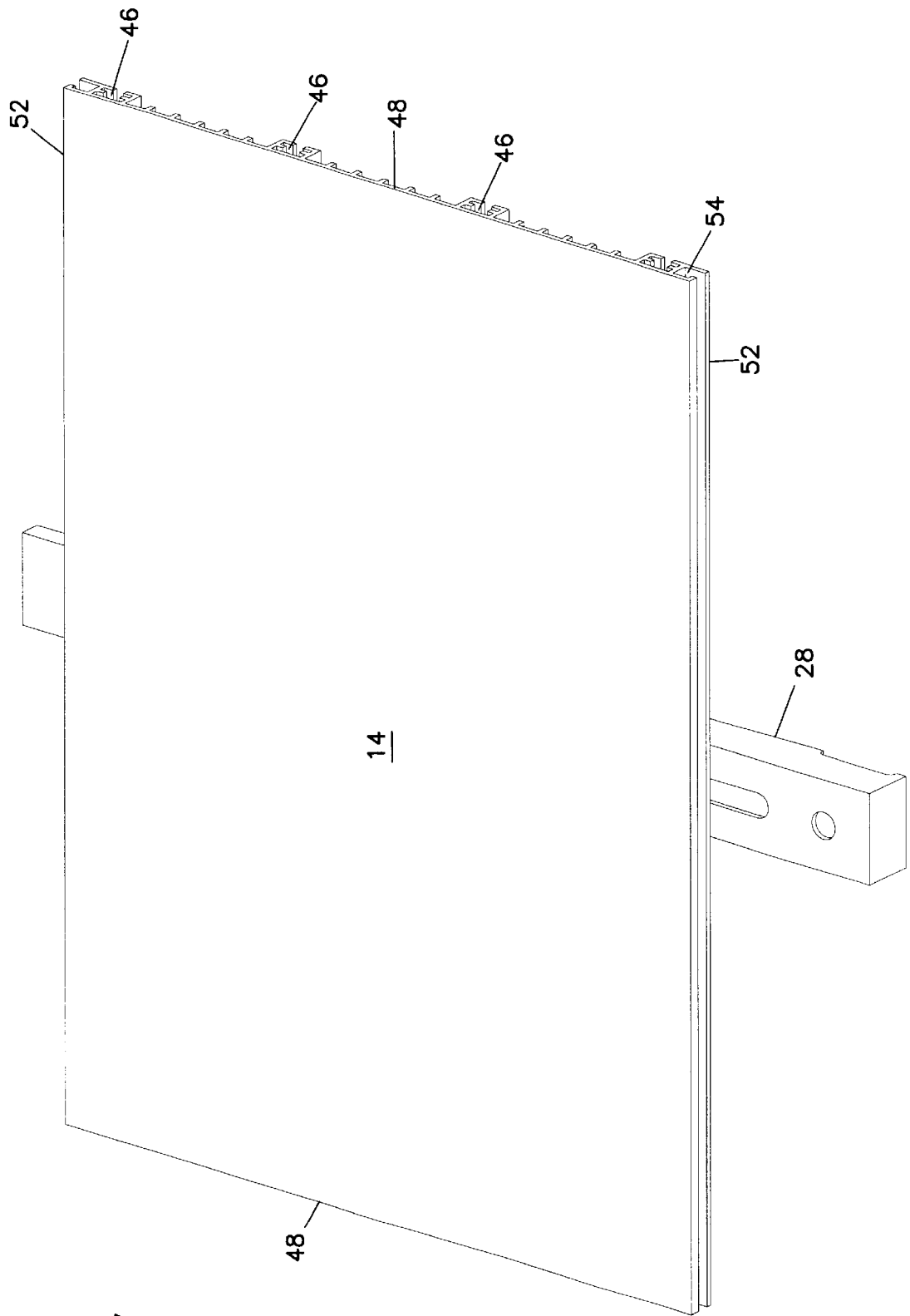
FIG. 7 is a perspective view the planar base element with a mounting bracket attached thereto.
Figure 8:
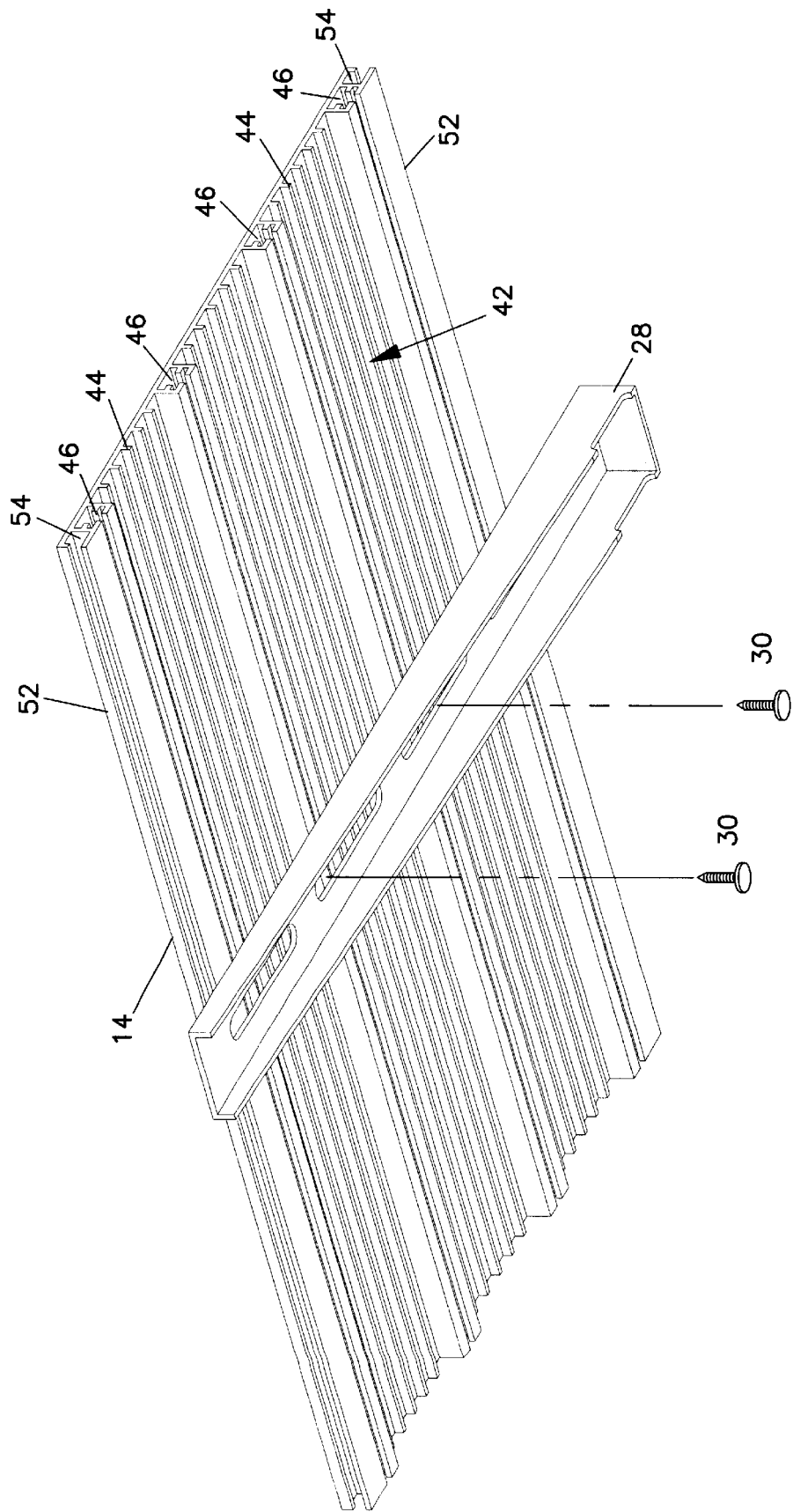
FIG. 8 is a bottom perspective view of the base element and the mounting bracket of FIG. 7.
Figure 9:
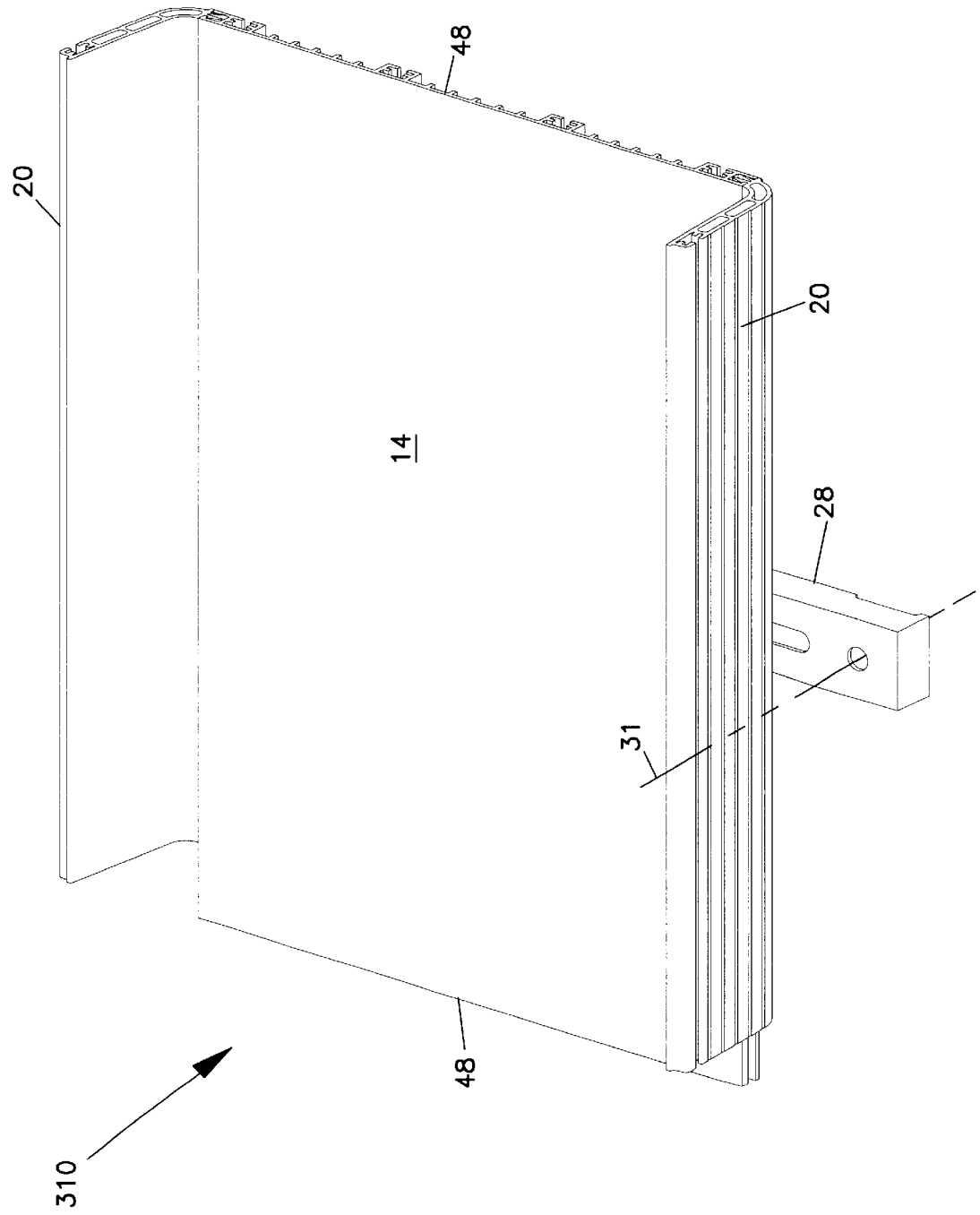
FIG. 9 is a perspective view of the base element and the mounting bracket of FIG. 7, and further including two upstanding side elements showing a fourth arrangement in accordance with the present invention.
Figure 10:
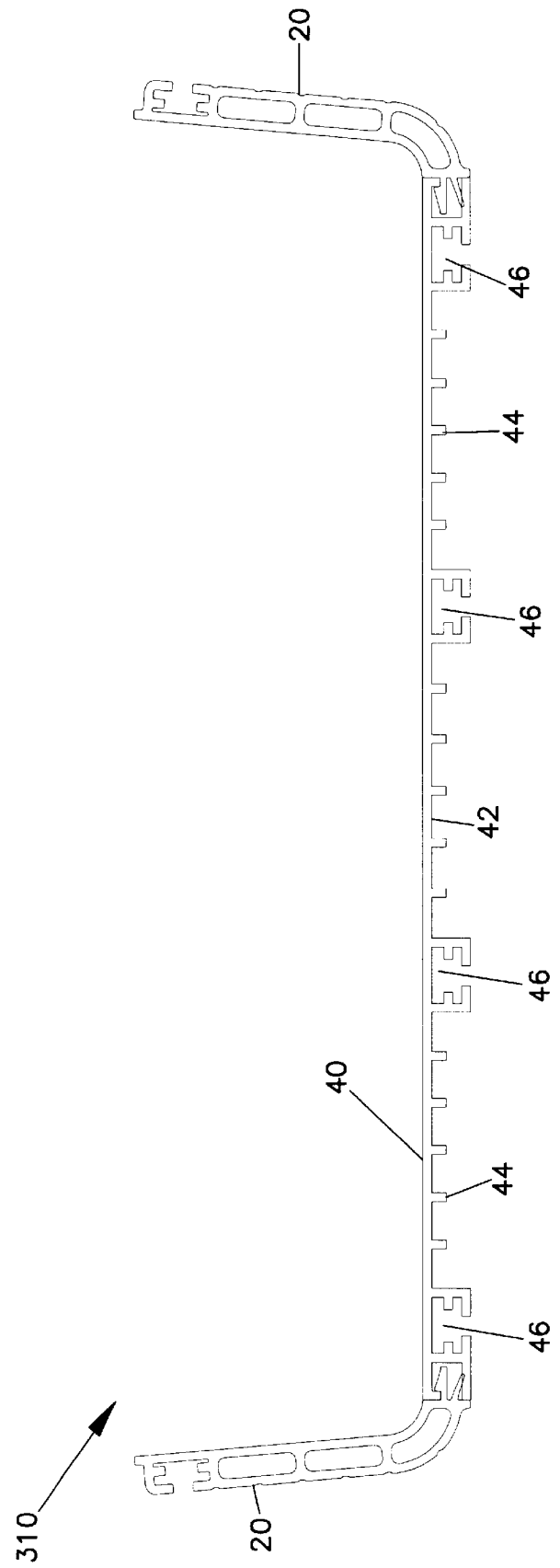
FIG. 10 is an end view of the fourth arrangement of FIG. 9, shown without the mounting bracket.

Referring now to FIGS. 5 and 6, a further modified system 210 is shown including a repositioned first downspout element 26a and a second downspout element 26b. With respect to side exits 22 and downspouts 26, any exposed corners associated with the devices are provided with a sufficient radius to avoid damage to the cables. See corners 27, 29 for elements 22, 26, respectively.

Referring now to FIGS. 7–11, base element 14 is shown including a bracket 28 to be mounted to bottom 42, such as with fasteners 30 received by channels 46. Bracket 28 is mounted to system support structure, such as structure supported by bay 12, or hung from the ceiling, along line 31.

Figure 11:
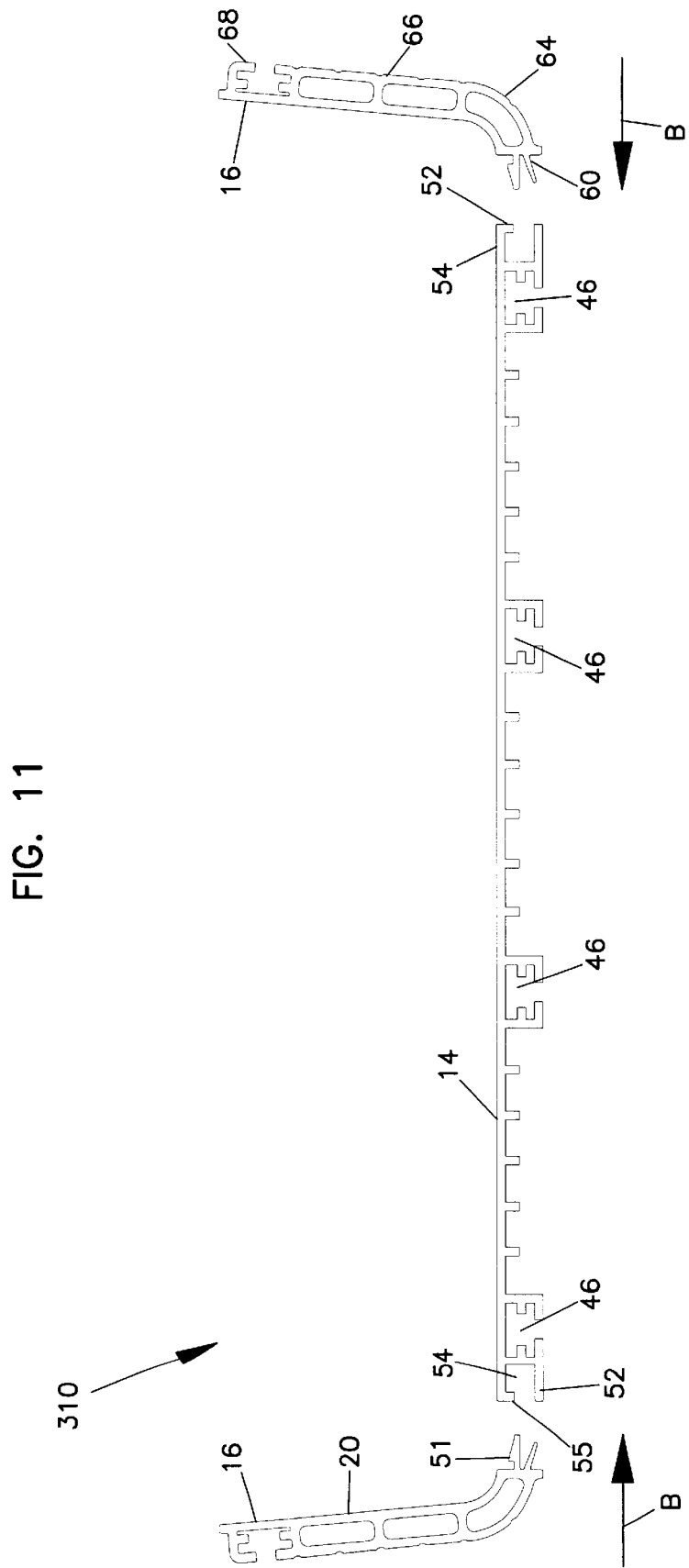
FIG. 11 is an exploded end view of the arrangement of FIG. 10.

Still referring to FIGS. 7–11, channel 54 of base element 14 permits snap mounting of side elements 16 to side edges 52 of base elements 14 in the direction of Arrow B in FIG. 11 to form a further system 310. The same snap mounting between side elements 16 and base element 14 is present in systems 10, 110 and 210. The mating arrangement 18 includes a tongue and groove type mating, and locking tabs 55,57.

The various separate components (i.e. base elements and side elements) of the present invention are mountable together to form the cable routing system. The preferred mating arrangement 18 between the base elements 14 and side elements 16 is a snap mount. Alternatively, fasteners or couplers to connect the components together can be used instead of snaps for the mating arrangement. Similarly, the joints between base elements 14, or the joints between side elements 16 can be by any of a variety of mating arrangements. Couplers, tongue and groove, or others can be used. It is to be noted that not every joint between the side elements 16 needs to be with a coupler or tongue and groove type mating arrangement. Butt joints may be sufficient for some portions of the cable management system.

As shown in FIG. 11, wall elements 20 include a horizontal section 60, forming the tongue portion of the tongue and groove mounting arrangement. Curved section 64 extends generally upwardly to generally vertical wall section 66. Wall section 66 includes a channel 68 similar in profile to channels 46. The use of channels 46, 68, permits other system components to mount thereto. Both wall elements 20 and base elements 14 have continuous cross-sections, and can be conveniently made from polymeric materials by an extrusion process and cut to the desired length.

Figure 12:
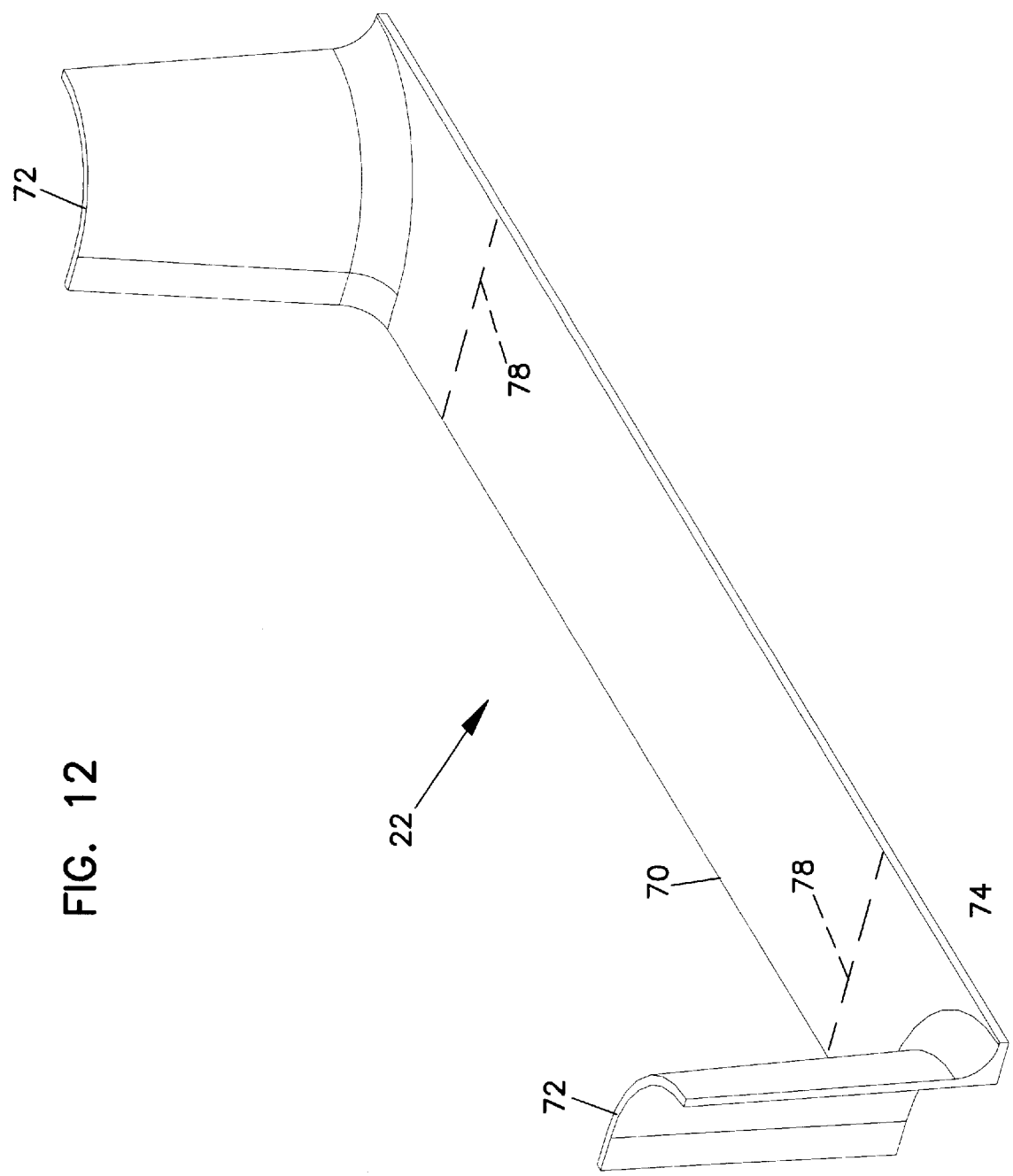
FIG. 12 is a perspective view of one of the side exit elements.

Referring now to FIG. 12, side exit element 22 includes a linear edge 70, two upstanding sidewalls 72 and a center section 74 which is generally horizontal. While the preferred embodiment of side exit element 22 is a one-piece design, a multi-piece design separated along lines 78 can be provided as will be further described below. Sidewalls 72 are preferably curved to avoid sharp edges that could damage the cables routed in system 10. Linear edge 70 defines the tongue of the mating arrangement.

Figure 13:
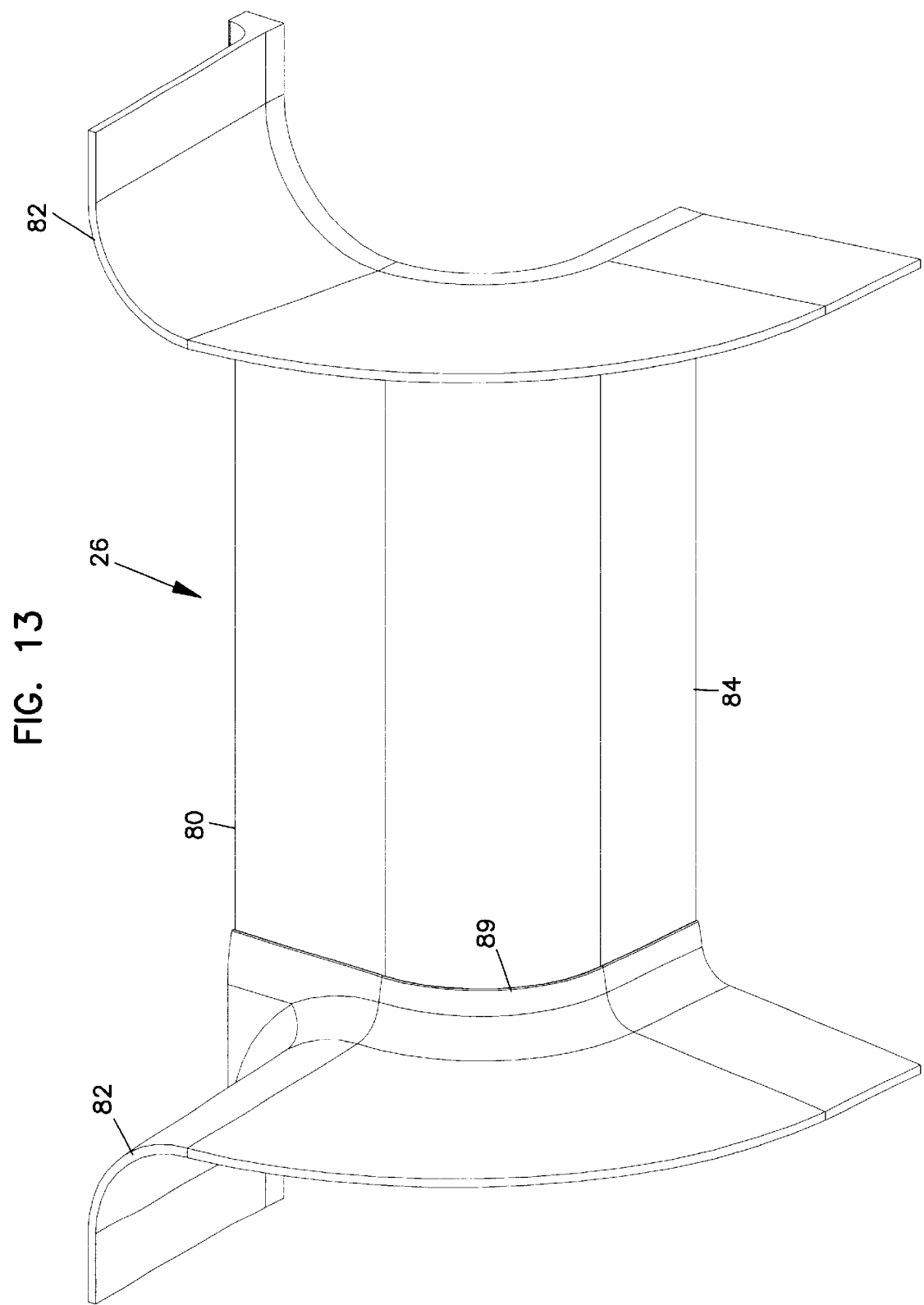
FIG. 13 is a perspective view of one of the downspout elements.
Figure 14:
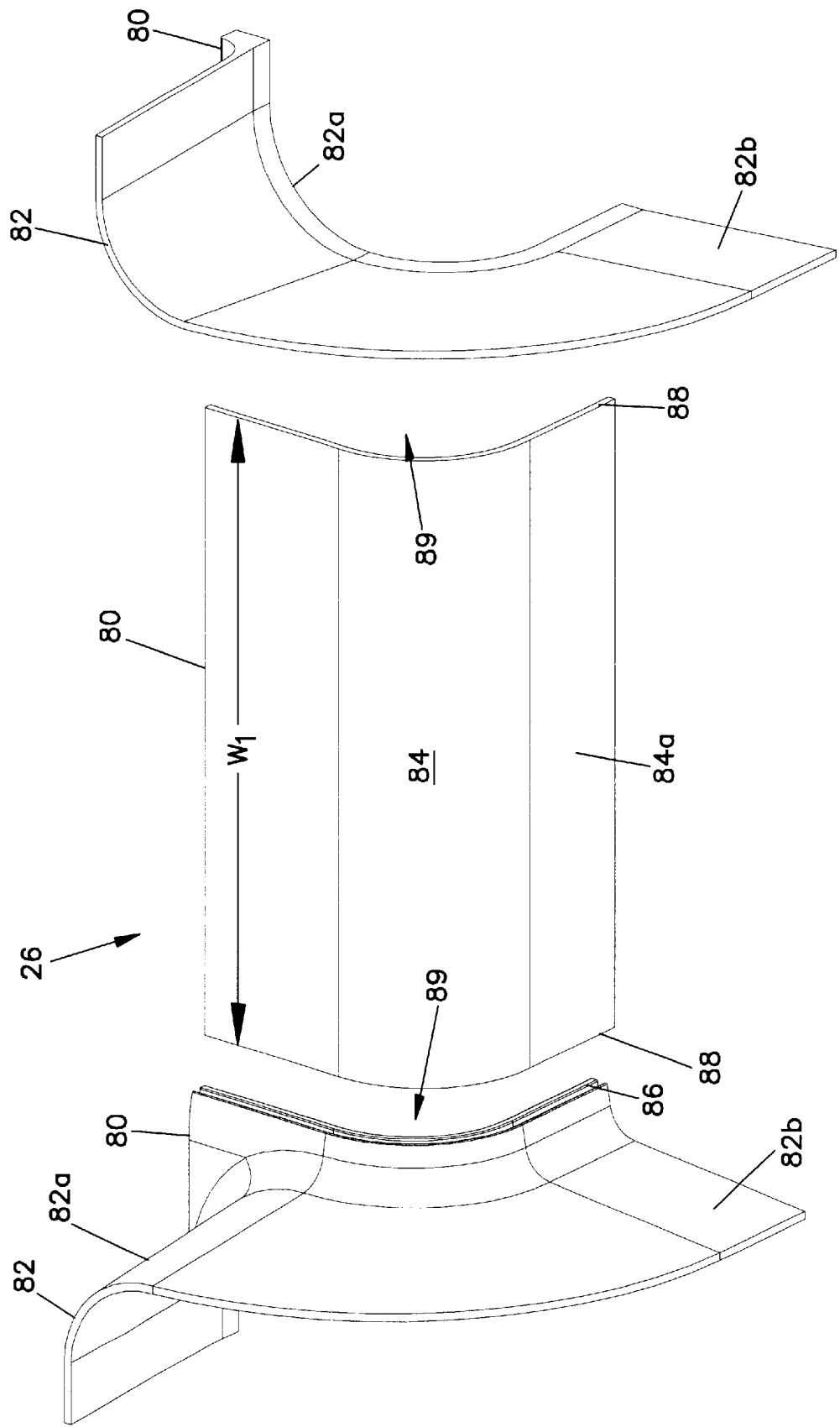
FIG. 14 is an exploded perspective view of the downspout element of FIG. 13.

Referring now to FIGS. 13 and 14, downspout element 26 includes a linear edge 80, two sidewalls 82, and a center section 84. Sidewalls 82 are curved at regions 82a to avoid sharp edges. Sidewalls 82 extend vertically downwardly at regions 82b along with region 84a of center region 84. Linear edge 80 defines the tongue of the mating arrangement. If desired, sidewalls 82 and center section 84 can be provided as separate elements, as shown in FIG. 14, where sidewalls 82 and center section 84 include matable edges 86, 88, preferably lying in a single plane, which is matable to form downspout element 26. Center section 84 can be cut to width W₁, to further customize the design. The mating arrangement 89 between sidewalls 82 and center section 84 can be any of a variety of structures, such as a tongue and groove. A similar separation of parts with a mating arrangement therebetween can be adopted for side exit element 22.

With the above-noted base elements 14, and side elements 16, or other base and side elements configured as desired, an appropriate system for cable management can be configured with relative ease. If desired, it is preferable that the system be modifiable at a later date. In the above-noted embodiments, side elements 16 are separable from base elements 14, so as to change from one type of side element to another. For example, removing an upstanding wall element 20, and replacing it with a side exit element 22 or a downspout element 26, and also possibly a shorter wall element 20 is conveniently handled by the present invention.

Figure 15:
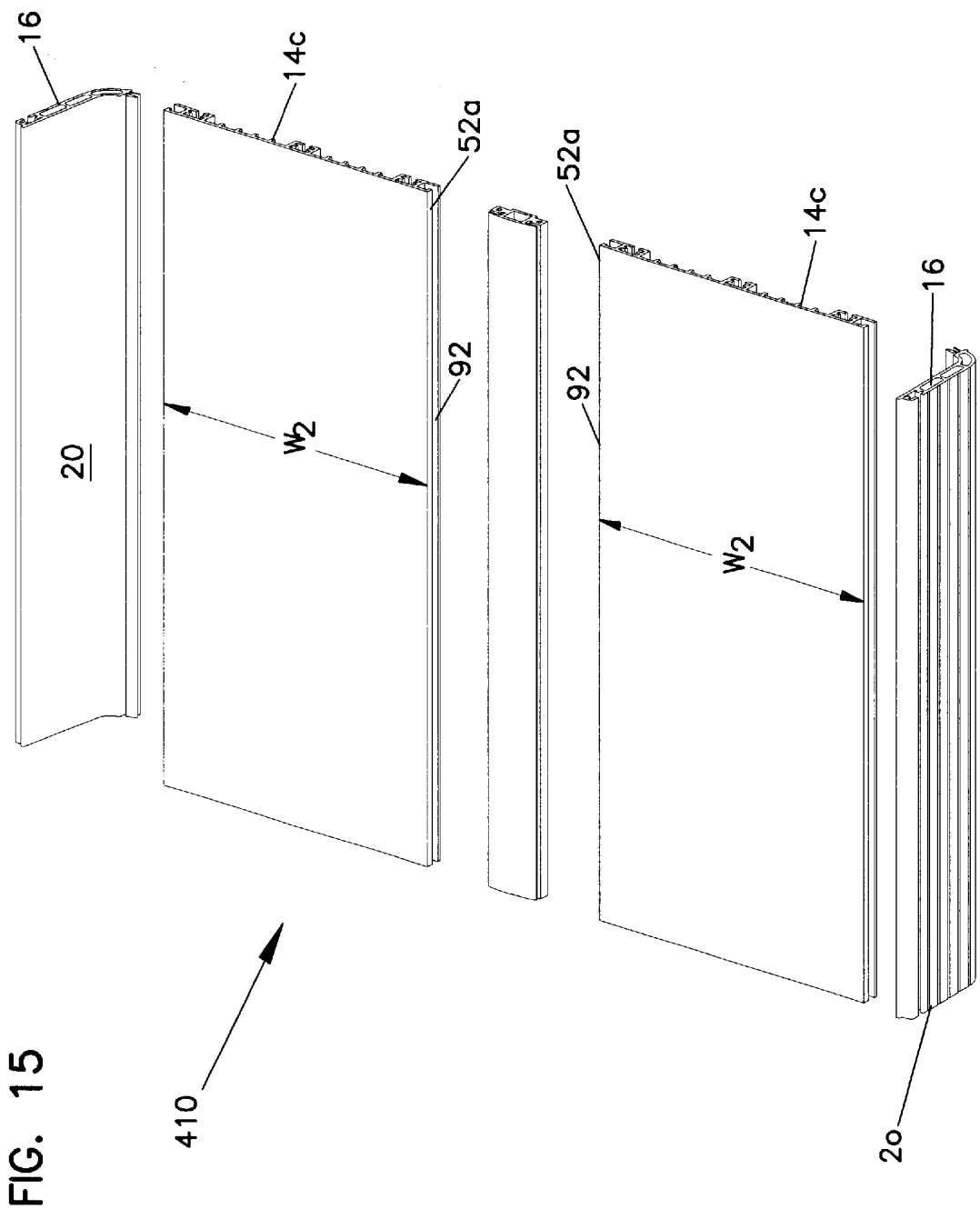
FIG. 15 is an exploded perspective view of a fifth arrangement in accordance with the present invention.

FIG. 15 shows a further system 410, including two modified base elements 14c, and a linking or coupling section 90. Modified base elements 14c are narrower in width W₂ than base elements 14 noted above. Linking section 90 extends laterally between laterally extending base elements 14c. Linking section 90 includes a reciprocal profile 92 for mating with side edges 52a. A tongue and groove type link with locking tabs is shown.

Figure 16:
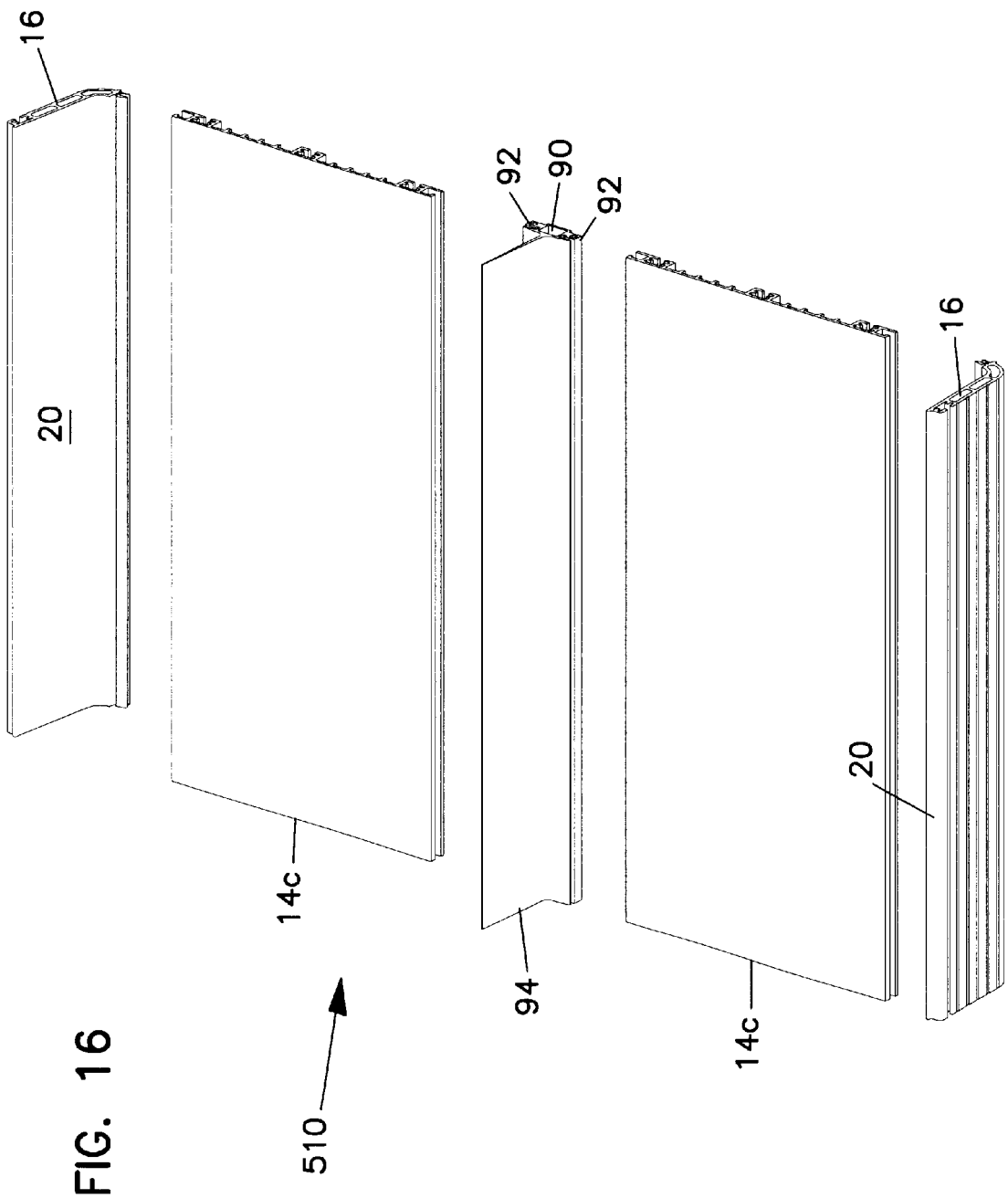
FIG. 16 is an exploded perspective view of a sixth arrangement in accordance with the present invention.

Referring now to FIG. 16, linking section 90 may be provided with an upstanding divider wall 94 in a further system 510.

Figure 17:
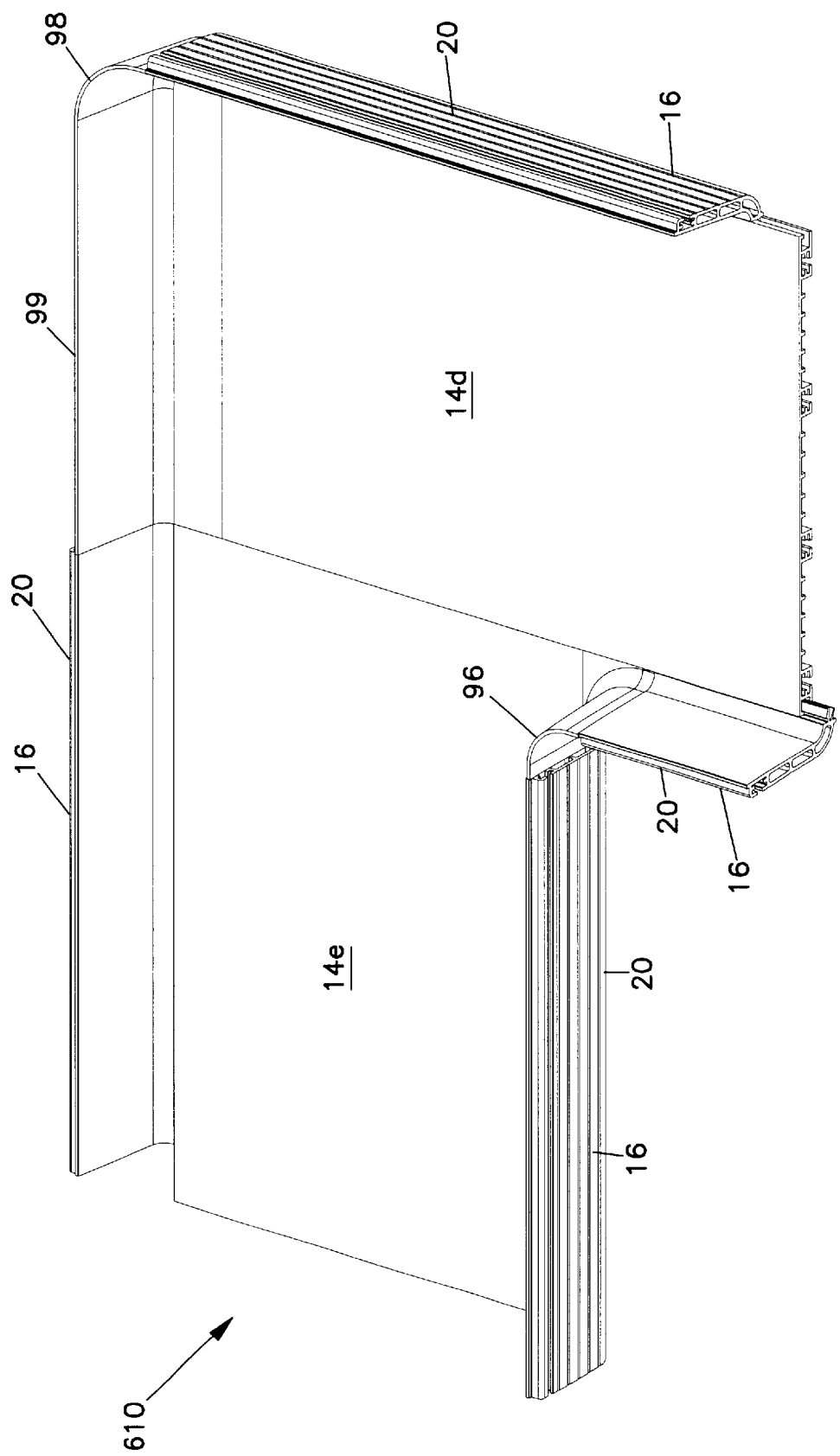
FIG. 17 is a perspective view of a seventh arrangement in accordance with the present invention.
Figure 18:
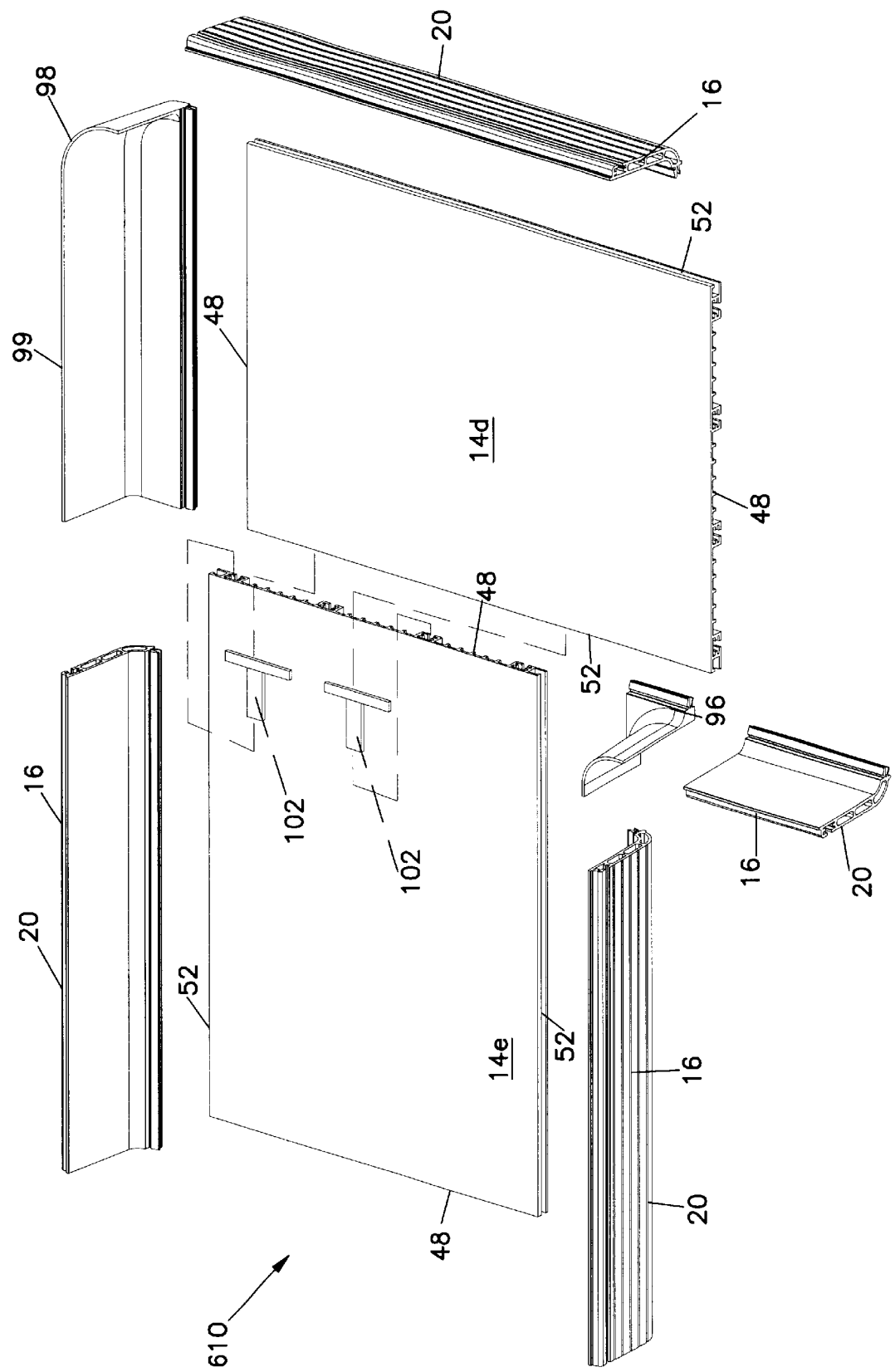
FIG. 18 is an exploded perspective view of the seventh arrangement.

Referring now to FIGS. 17 and 18, a 90-degree bend is provided in system 610. T-couplings 102 are shown for joining side edge 52 of base element 14d to end edge 48 of base element 14e. FIG. 18 also shows an internal corner 96 and an external corner 98 with sidewall segment 99.

Figure 19:
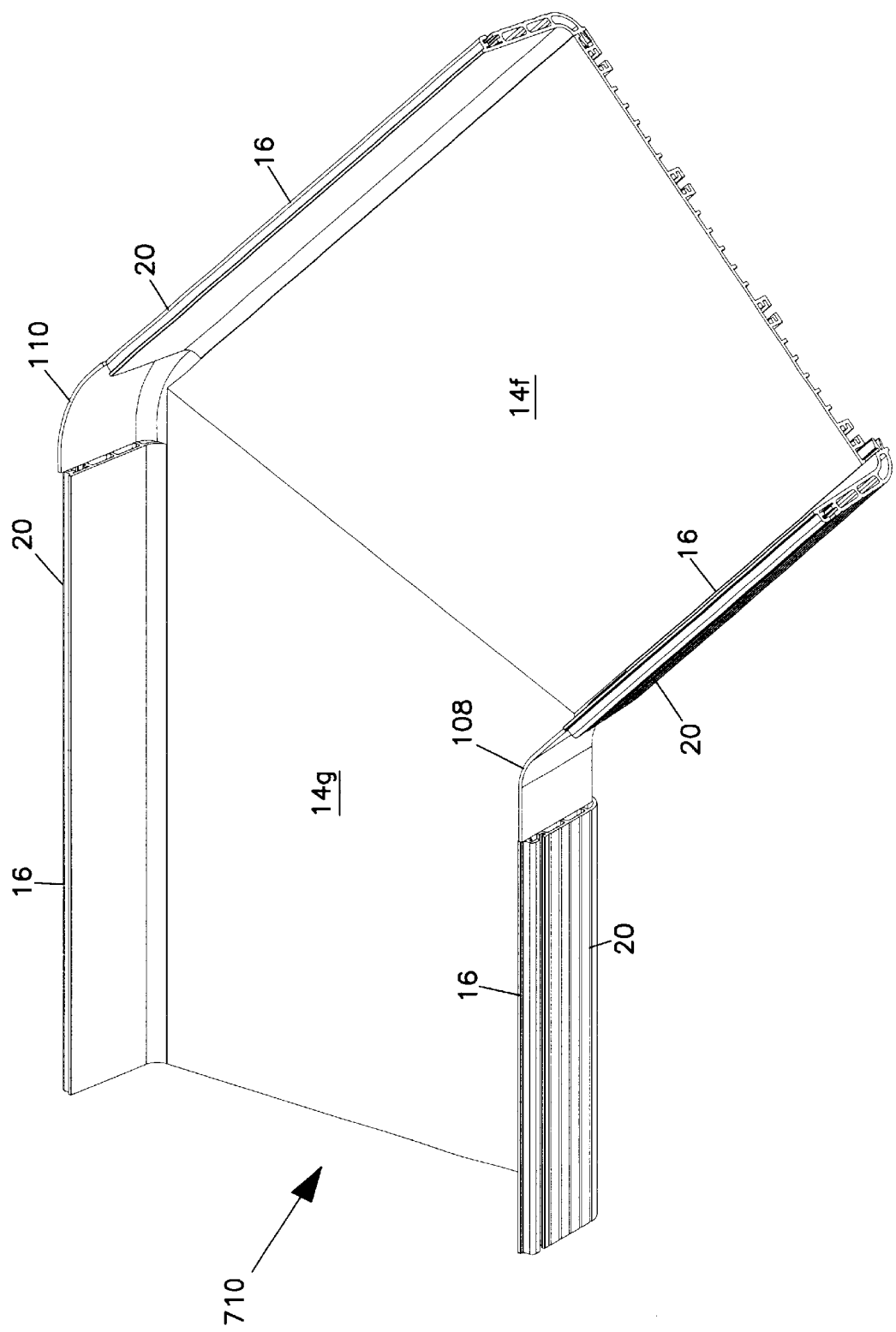
FIG. 19 is a perspective view of an eighth arrangement in accordance with the present invention.
Figure 20:
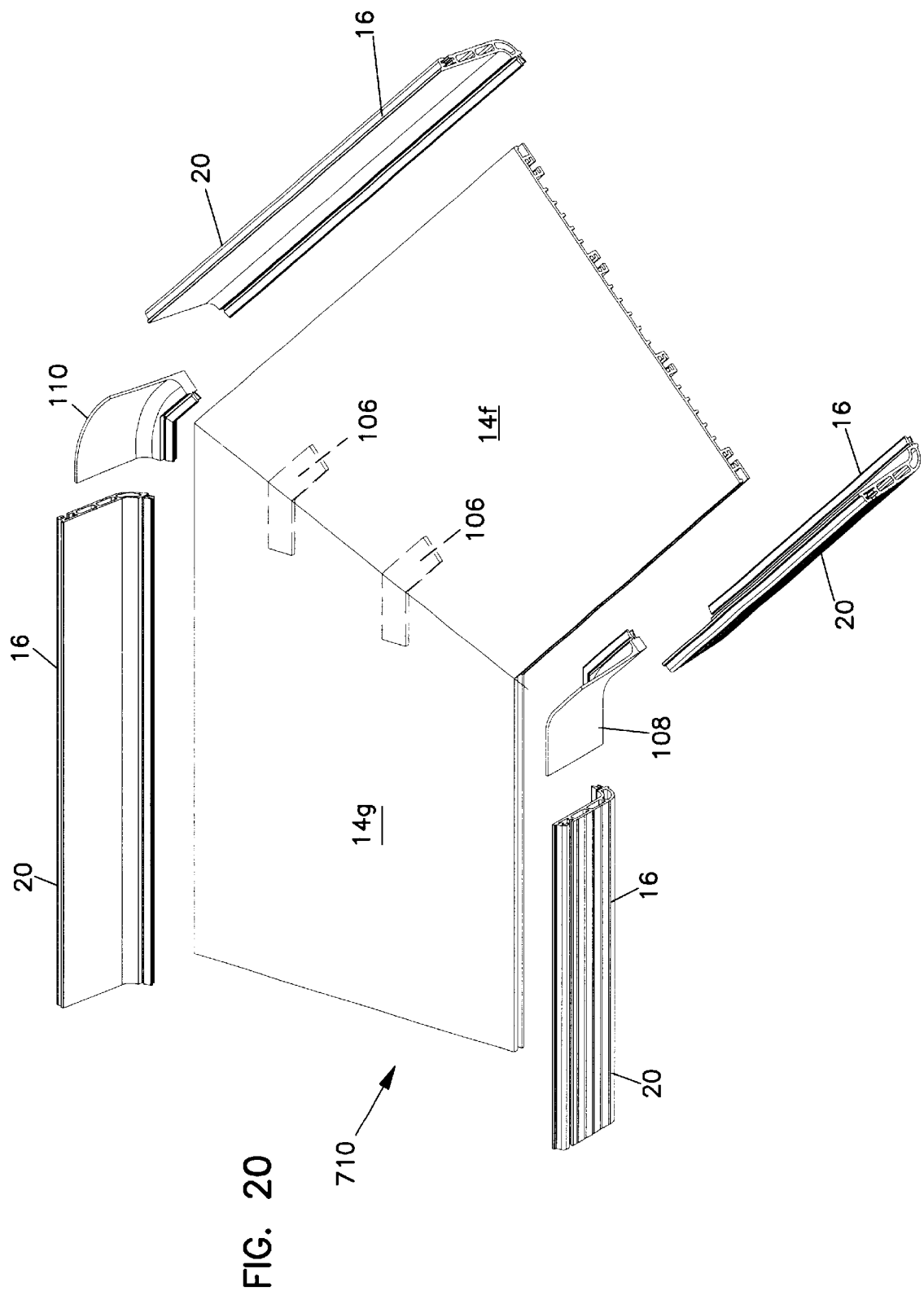
FIG. 20 is an exploded perspective view of the arrangement shown in FIG. 19.

Referring now to FIGS. 19 and 20, a 45-degree bend is provided in system 710. L-couplings 106 join base elements 14f and 14g. Internal corner 108 and external corner 110 join to base elements 14f, g and wall elements 20.

Referring now to FIGS. 21 and 22, a 45-degree vertical height change is provided in system 810. End 114 is at a greater vertical height than end 116. FIG. 21 shows one manner of using separate parts 118–123 to construct the system 810.

With the present invention, a variety of widths W₃ (see FIG. 2) can be provided such as 12 inches, 18 inches, 24 inches, or other. Further widths can be handled by using intermediate lateral linking sections or couplings as noted above (i.e. 12 inches and 18 inches, 18 inches and 18 inches).

The base elements noted above provide a platform from which a wide variety of cable routing systems can be assembled with the desired widths, lengths and side elements to enable efficient and protective routing of the cables. Such customization and flexibility both during assembly, and preferably at a later time if modifications are needed, is achieved by using the matable base element(s) and side element(s) of the types noted above and in the various examples illustrated in the drawings.

The above specification, examples and data provide a complete description of the manufacture and use of the invention. Since many embodiments of the invention can be made without departing from the spirit and scope of the invention, the invention resides in the claims hereinafter appended.

What is claimed is:

1. A telecommunications cable management system comprising:

a base element including a planar top surface, and an opposite facing bottom surface, the base element including first and second ends, and first and second sides, the ends and the sides forming a perimeter of the base element, each of the sides having a continuous cross-section along the length of each side;

a plurality of separate side elements;

a mating arrangement between the sides of the base element and the separate side elements;

wherein at least one of the side elements includes an upstanding wall portion;

wherein at least one of the side elements includes a side exit having a linear edge mounted with the mating arrangement to one of the sides of the base element, two opposed upstanding sidewall portions, and a horizontally extending center section, the sidewall portions and the center section extending from the linear edge.

2. The system of claim 1, wherein the sidewall portions and the center section are separate elements of the side exit, and further comprising a mating arrangement between the sidewall portions and the center section.

3. The system of claim 1, wherein at least one of the side elements includes a downspout having a linear edge mounted with the mating arrangement to one of the sides of the base element, two opposed upstanding sidewall portions, and a center section, the sidewall portions and the center section extending from the linear edge vertically downwardly.

4. The system of claim 3, wherein the sidewall portions and the center section are separate elements of the downspout, and further comprising a mating arrangement between the sidewall portions and the center section.

5. The system of claim 1, wherein the base element includes first and second laterally extending sections, and a linking section positioned therebetween, and further including a mating arrangement between the linking section and each of the first and second lateral sections.

6. The system of claim 5, wherein the linking section includes a laterally extending divider wall.

7. A telecommunications cable management system comprising:

a base element including a planar top surface, and an opposite facing bottom surface, the base element including first and second ends, and first and second sides, the ends and the sides forming a perimeter of the base element;

a plurality of side elements;

a mating arrangement between the sides of the base element and the side elements;

wherein at least one of the side elements includes an upstanding wall portion;

wherein at least one of the side elements includes a side exit having a linear edge mounted with the mating arrangement to one of the sides of the base element, two opposed upstanding sidewall portions, and a horizontally extending center section, the sidewall portions and the center section extending from the linear edge;

wherein the sidewall portions and the center section are separate elements of the side exit, and further comprising a mating arrangement between the sidewall portions and the center section.

8. A telecommunications cable management system comprising:
- a base element including a planar top surface, and an opposite facing bottom surface, the base element including first and second ends, and first and second sides, the ends and the sides forming a perimeter of the base element;
- a plurality of side elements;
- a mating arrangement between the sides of the base element and the side elements;
- wherein at least one of the side elements includes an upstanding wall portion;
- wherein at least one of the side elements includes a downspout having a linear edge mounted with the mating arrangement to one of the sides of the base element, two opposed upstanding sidewall portions, and a center section, the sidewall portions and the center section extending from the linear edge vertically downwardly.

9. The system of claim 8, wherein the sidewall portions and the center section are separate elements of the downspout, and further comprising a mating arrangement between the sidewall portions and the center section.

10. A telecommunications cable management system comprising:
- a base element including a planar top surface, and an opposite facing bottom surface, the base element including first and second ends, and first and second sides, the ends and the sides forming a perimeter of the base element;
- a plurality of side elements;
- a mating arrangement between the sides of the base element and the side elements;
- wherein at least one of the side elements includes an upstanding wall portion;
- wherein the base element includes first and second laterally extending sections, and a linking section positioned therebetween, and further including a mating arrangement between the linking section and each of the first and second lateral sections.

11. The system of claim 10, wherein the linking section includes a laterally extending divider wall.

12. A telecommunications cable management system comprising:
- a base element including a planar top surface, and an opposite facing bottom surface, the base element including first and second ends, and first and second sides, the ends and the sides forming a perimeter of the base element, each of the sides having a continuous cross-section along the length of each side;
- a plurality of separate side elements;
- a mating arrangement between the sides of the base element and the separate side elements;
- wherein at least one of the side elements includes an upstanding wall portion;
- wherein at least one of the side elements includes a downspout having a linear edge mounted with the mating arrangement to one of the sides of the base element, two opposed upstanding sidewall portions, and a center section, the sidewall portions and the center section extending from the linear edge vertically downwardly.

13. The system of claim 12, wherein the sidewall portions and the center section are separate elements of the downspout, and further comprising a mating arrangement between the sidewall portions and the center section.

14. A telecommunications cable management system comprising:
- a base element including a planar top surface, and an opposite facing bottom surface, the base element including first and second ends, and first and second sides, the ends and the sides forming a perimeter of the base element, each of the sides having a continuous cross-section along the length of each side;
- a plurality of separate side elements;
- a mating arrangement between the sides of the base element and the separate side elements;
- wherein at least one of the side elements includes an upstanding wall portion;
- wherein the base element includes first and second laterally extending sections, and a linking section positioned therebetween, and further including a mating arrangement between the linking section and each of the first and second lateral sections.

15. The system of claim 14, wherein the linking section includes a laterally extending divider wall.

* * * * *

UNITED STATES PATENT AND TRADEMARK OFFICE
CERTIFICATE OF CORRECTION

PATENT NO. : 6,631,875 B1
DATED : October 14, 2003
INVENTOR(S) : Kampf et al.

It is certified that error appears in the above-identified patent and that said Letters Patent is hereby corrected as shown below:

<u>Title page,</u>
Item [56], References Cited, U.S. PATENT DOCUMENTS, insert the following:
-- 799,320      9/1905  Franks
 3,351,699    11/1967  Merckle
 4,077,434      3/1978  Sieckert et al.
 Des. 321,682 11/1991 Henneberger
 Des. 321,862 11/1991 Henneberger
 5,469,893    11/1995  Caveney et al.
 5,899,025      5/1999  Casey et al.
 6,037,543      3/2000  Nicoli et al.
 6,198,047      3/2001  Barr --

Signed and Sealed this

Eleventh Day of May, 2004

JON W. DUDAS
*Acting Director of the United States Patent and Trademark Office*